O. MOBBERLY.
WHEEL.
APPLICATION FILED MAY 5, 1911.
1,037,652.
Patented Sept. 3, 1912.
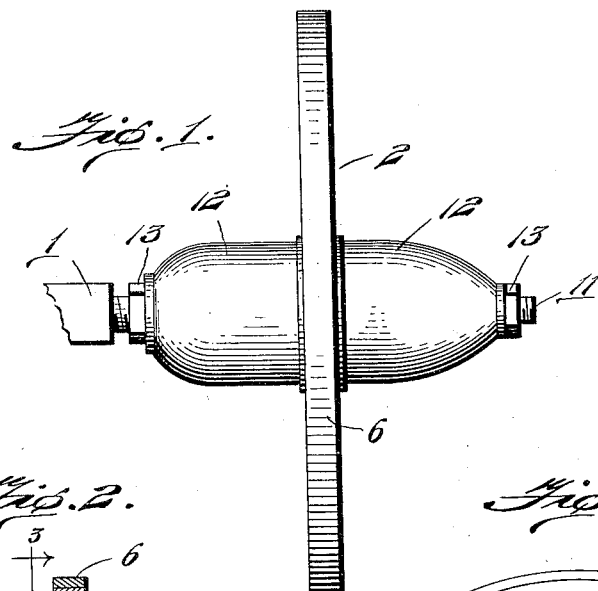
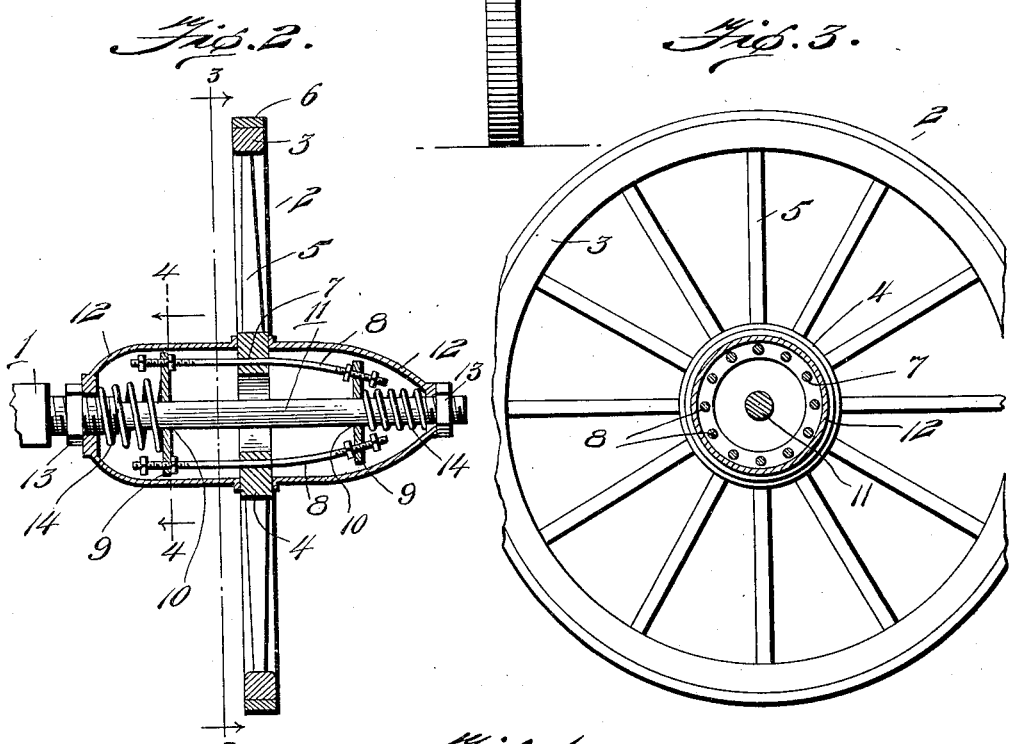
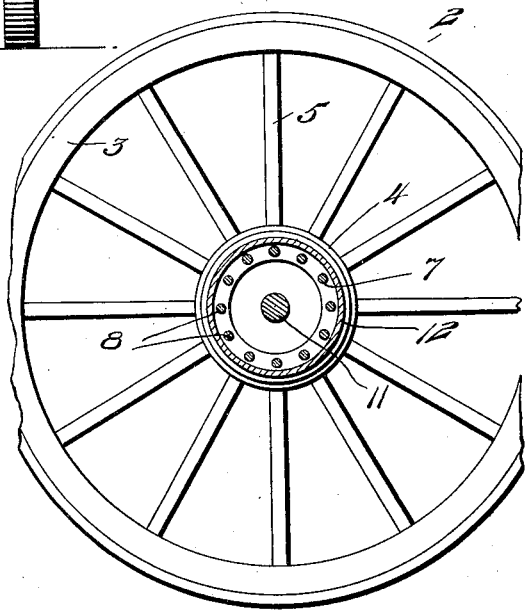
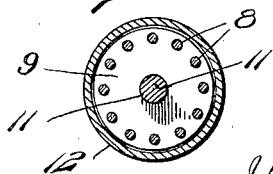
Witnesses
Inventor
Ora Mobberly
By
Attorney

UNITED STATES PATENT OFFICE.

ORA MOBBERLY, OF CORBIN, KENTUCKY, ASSIGNOR OF ONE-THIRD TO JOHN MOBBERLY, OF CORBIN, KENTUCKY.

WHEEL.

1,037,652.  Specification of Letters Patent.  Patented Sept. 3, 1912.

Application filed May 5, 1911. Serial No. 625,272.

*To all whom it may concern:*

Be it known that I, ORA MOBBERLY, a citizen of the United States, residing at Corbin, in the county of Whitley and State of Kentucky, have invented certain new and useful Improvements in Wheels; and I do hereby declare the following to be a full, clear, and exact description of the invention, such as will enable others skilled in the art to which it appertains to make and use the same.

This invention relates to new and useful improvements in wheels for vehicles or the like, and has for an object the provision of an improved construction of spring hub or center, which will permit of the elimination of the customary resilient tires.

Another object of this invention is the provision of a spring hub center for wheels, which will be comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawing, in which—

Figure 1 is a side elevation of my improved wheel; Fig. 2 is a vertical longitudinal sectional view thereof; Fig. 3 is a sectional view taken on the line 3—3 of Fig. 1; and Fig. 4 is a sectional view taken on the line 4—4 of Fig 1.

Referring to the drawing by characters of reference, the numeral 1 designates generally the axle of a vehicle, to which is rotatably secured my improved wheel 2. The wheel 2 consists of an outer rim 3 and a central ring 4 connected to the rim 3 by spokes 5. A suitable tire 6, of any desired design may be secured in any manner to the outer rim 3. The ring 4 is transversely apertured as shown at 7, for the reception of transversely extending spring rods 8, the outer ends of which are slidingly secured within circular heads 9, which are centrally apertured, as at 10, for the reception of the spindle 11 of the axle 1. The axle 1 has loosely mounted thereon a pair of caps 12, constructed from any desired material, which contact with the opposite sides of the inner rim 4 and conceal the operating parts from contact with dust, dirt or the like. These caps 12 are held in place by suitable locking nuts 13. Coil springs 14 surround the cylindrical portion of the axle adjacent the opposite ends of the caps, and are secured thereto and to the heads 9, for the purpose of yieldingly holding them in their normal positions.

By means of the foregoing construction a resilient hub is provided, the flexible rods 8 and the coil springs 14 providing cushioning means to permit a play of the hub upon the axle, thereby providing a resilient wheel accommodating itself to irregular movements of the vehicle.

Having thus fully described this invention, what I claim as new and desire to secure by Letters Patent is:

The combination with a vehicle axle, of a wheel having a central ring, spokes connecting said ring with the rim of the wheel, a hollow hub consisting of a cap on each side of said ring, a head slidable on the axle within said caps on each side of said ring, flexible rods extending through said ring and having their ends slidably mounted in said heads, and springs mounted on the axle and engaging the end of each of said caps and the slidable head adjacent thereto.

In testimony whereof I affix my signature in presence of two witnesses.

ORA MOBBERLY.

Witnesses:
J. E. BABB,
D. B. CALVERT.

Copies of this patent may be obtained for five cents each, by addressing the "Commissioner of Patents, Washington, D. C."